July 19, 1966  C. C. ANDERSON ETAL  3,261,459
ARTICLE STRIP CARRIER

Filed March 23, 1965  2 Sheets-Sheet 1

CHARLES C. ANDERSON
RONALD S. NAROZNY
THOMAS F. BROWN
　　　　INVENTORS.

BY
ATTORNEY.

July 19, 1966   C. C. ANDERSON ETAL   3,261,459
ARTICLE STRIP CARRIER
Filed March 23, 1965   2 Sheets-Sheet 2

CHARLES C. ANDERSON
RONALD S. NAROZNY
THOMAS F. BROWN
INVENTORS.

ATTORNEY.

United States Patent Office 3,261,459
Patented July 19, 1966

3,261,459
ARTICLE STRIP CARRIER
Charles C. Anderson, Altadena, Ronald S. Narozny, Panorama City, and Thomas F. Brown, Anaheim, Calif., assignors to International Telephone and Telegraph Corporation, New York, N.Y., a corporation of Maryland
Filed Mar. 23, 1965, Ser. No. 442,112
1 Claim. (Cl. 206—56)

This invention relates in general to article strip carriers and in particular to article strip carriers for small cylindrical components.

In the small components field, such as contacts for electrical connectors, for example, manufacturers and distributors are faced with the problem of storing, inventorying, packaging, and shipping large quantities or predetermined quantities of small components. Several handling methods have been utilized, including weighing and/or actual counting, either manually or mechanically, but these methods have the disadvantage of high labor cost and substantial capital investments in machinery. Accordingly, it is an object of this invention to provide a low cost, compact strip carrier in which the articles or small components are housed and in which the heretofore expensive counting processes are obviated by providing spaced quantity markings on the carrier.

While many manufacturers solve the above-mentioned packaging problem by placing predetermined quantities in marked packages, the varied and diversified types of products which use differing quantities of small components necessitates a large inventory of many-sized packages. Thus, another object of this invention is to provide a main continuous strip carrier with quantity designations thereon and which can be divided into individual smaller strips of predetermined quantities by simply severing the desired lengths from the main strip carrier.

Regardless of the type of quantity determination procedures followed heretofore, once the small components reach their destination for end use, additional component handling is usually required for alignment and utilization purposes. It is another object of the present invention to eliminate the manual or mechanical handling required for utilization of the components in the end product by providing a strip carrier having a removable portion which exposes the portion of the component to be processed while retaining the shipped components in predetermined orientation and position.

A still further object is to provide a strip carrier for a plurality of similar and small components which during storing or shipping are maintained in a substantially dust-free atmosphere, yet which can be opened for inspection and subsequent re-closing without damage to the strip carrier.

Still another object is to provide a strip carrier for small components in which the carrier includes transparent material affording a visual inspection and identification of the components without opening or altering the strip carrier.

Other objects relate to the provision of a strip carrier which is adaptable for flat shipment or shipment in cylindrical containers.

Still other objects and features will become apparent and the invention will be best understood when the specification and claim are read in conjunction with the accompanying drawings comprising FIGS. 1 to 11 in which:

Figure 1:
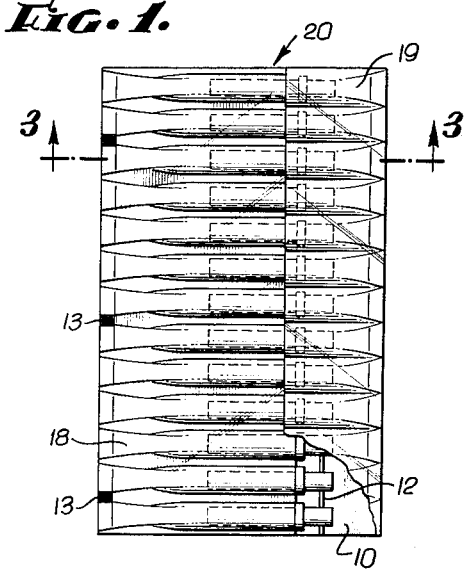
FIG. 1 shows a top plan view of a length of the inventive strip carrier containing a plurality of small components.
Figure 2:
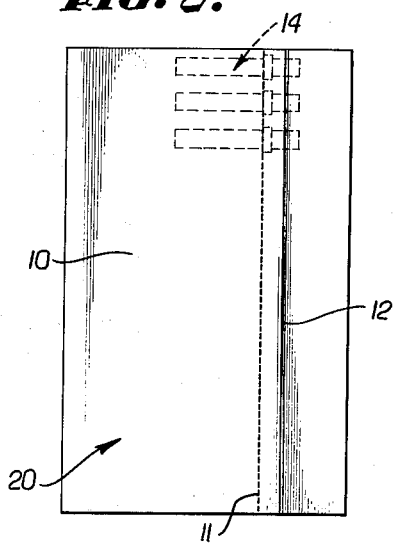
FIG. 2 shows a bottom plan view of the strip carrier of FIG. 1 to illustrate crease lines and perforations of the carrier.

The strip carrier includes a resilient or flexible base plate 10 which is preferably formed from a thin strip of paper coated with polyethylene. One edge of this strip will be termed the cover edge and the other termed the pocket edge. A series of aligned perforations 11 are provided near the cover edge of the base plate 10 and in parallel relation therewith. Also, a partially cut or indented crease 12, parallel to the series of perforations 11, is provided between the series of perforations and the cover edge of the plate 10.

A series of spaced marks or indicia 13 is provided along the pocket edge of the base plate 10, the distance between each mark 13 being predetermined according to the size of the pockets of the components being packaged.

As illustrated in the drawings, the strip carrier houses a plurality of similar electrical contacts 14 which include a collar 15 separating the forward end 16 of the contact from the termination end 17. It has been chosen to illustrate a strip carrier designed to carry contacts and contacts of a predetermined diameter but of varying lengths, by selecting a paper base of a width exceeding the length of the contacts to be carried.

A top housing strip 18, preferably of a transparent polyethylene material and of a width slightly in excess of the distance from the spaced perforations 11 to the pocket edge of the base plate 10, is corrugated to define a plurality of pockets and is joined by heat treating at the edges and at one end of the pockets to cause it to adhere to the base plate. The upper end of the pocket thus formed is in alignment with the series of perforations.

Figure 3:
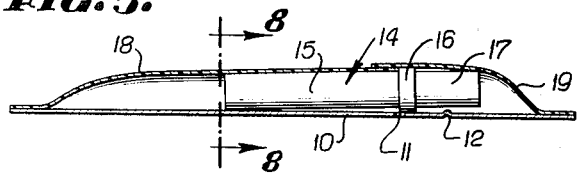
FIG. 3 shows a cross-sectional view of the strip carrier of FIG. 1 taken along lines 3—3 of FIG. 1.
Figure 8:
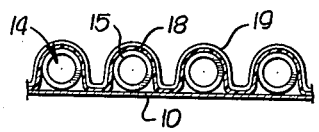
FIG. 8 shows a cross-sectional end view of a portion of the inventive strip carrier taken along lines 8—8 of FIG. 3.

A cover strip 19, likewise preferably of a polyethylene material and of a width substantially in excess of the distance between the series of perforations 11 and the cover edge of the base plate 10, is corrugated to form pockets in alignment with the pockets of the main cover 18 and is sealed by heat treatment at one end near the cover edge of the base plate and at its sides for a distance extending between the crease 12 and the cover end of the base plate. As best seen in FIGS. 1 and 3, the cover 19 overlaps the top housing 18, and by virtue of the aligned pocket configuration forms a relatively dust-free chamber for encompassing components such as contacts 14. A cross-sectional view of the main pockets, the overlapping cover and encompassed contacts are shown in FIG. 8.

As best seen in FIG. 3, the contacts 14 are inserted in the main pockets formed by the top housing until the collar 16 abuts the upper edge of the main pockets. Since the top edge of the main pockets are in alignment with the series of perforations, the forward edge of the contact collar 16 lies directly above the noted perforations 11.

When assembled and packaged as shown in FIG. 1, a transparent, relatively dust-proof, flexible strip carrier is provided for holding a plurality of similar components.

Figure 4:
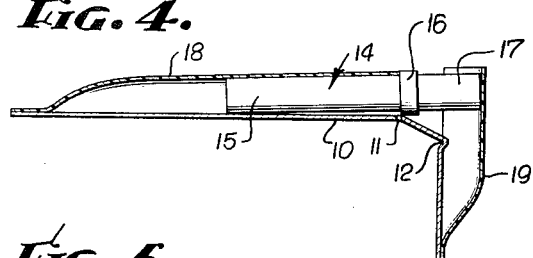
FIGS. 4 and 5 show a cross-sectional view of the strip carrier of FIG. 1 with its cover in various operated or opened positions.

In order to remove one or more components or contacts 14 for inspection or use, the cover 19 is moved downwardly and at right angles to the plane of the base plate 10 causing sharp bends to occur along the series of perforations and along the preformed crease 12. The several positions of the cover 19 and the angles formed along the crease 12 and series of perforations 11 are shown in FIGS. 4 and 5.

Figure 5:
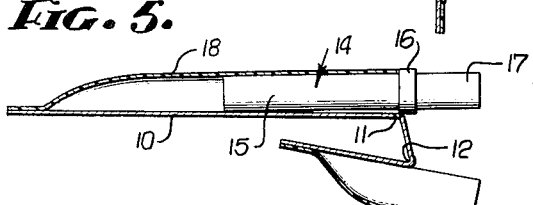

When the cover is in the position shown in FIG. 5, the contacts may be removed and replaced as desired. Thereafter, the cover 19 may be returned to the position shown in FIG. 3 reclosing the noted dust-proof compartments.

Figure 6:
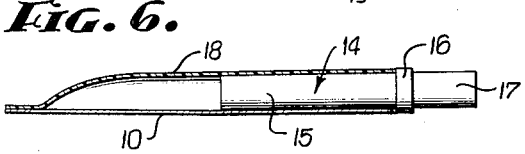
FIG. 6 shows a cross-sectional view of the strip carrier of FIG. 1 with the cover removed from the remainder of the carrier.
Figure 7:
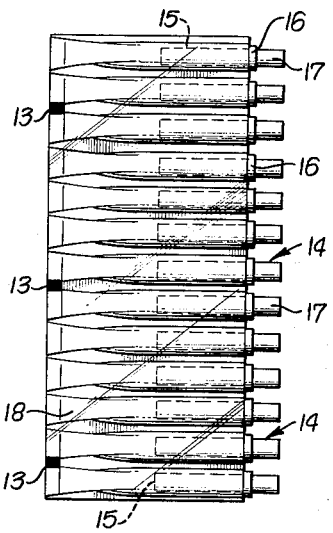
FIG. 7 shows a top plan view of the strip carrier of FIG. 1 with the cover detached.

If desired, the cover 19 may be detached from the main portion of plate 10 by tearing the cover portion of the base plate along the perforations 11. The carrier strip with the cover removed is shown in cross-sectional view in FIG. 6 and in a top plan view in FIG. 7. In this condition, the contacts 14 are retained in aligned position with the collar 16 and termination end 17 completely exposed for securing to desired wires or conductors by manual or automatic crimping operations, for example.

Figure 9:
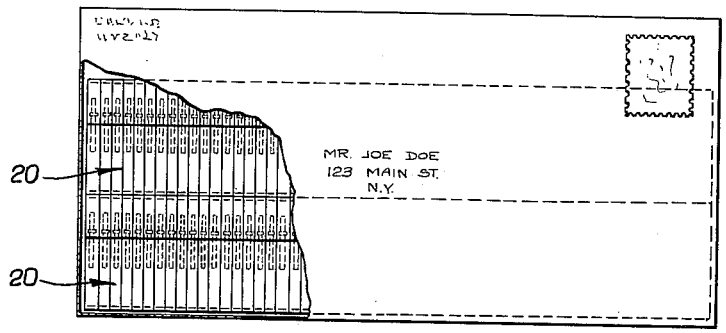
FIGS. 9 through 11 show various methods of shipping the inventive strip carrier containing small components.

FIG. 9 shows a cut-away portion of a mailable envelope including two lengths of the strip carrier containing contacts positioned therein.

Figure 10:
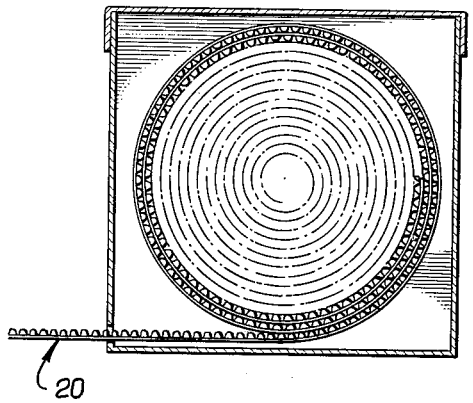

FIG. 10 shows a long length of strip carrier arranged in a roll and placed in a shipping carton which may also be used as a dispenser in which desired lengths of the strip carrier may be unrolled and cut.

Figure 11:
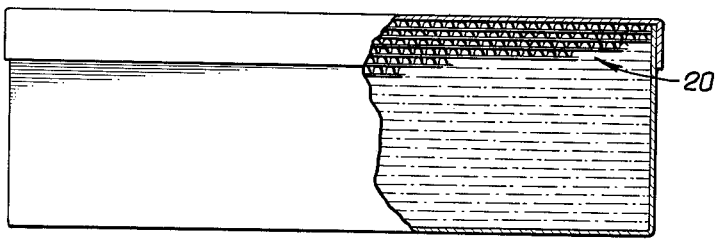

FIG. 11 shows still another type of shipping container wherein a plurality of predetermined lengths of the strip carrier are positioned one above the other. This carton and above-mentioned mailing or shipping devices illustrate the adaptability of the inventive strip carrier to numerous modes of handling.

While we have described our invention in conjunction with specific apparatus, it is to be understood that numerous other embodiments and variations could be made without departing from the spirit of the invention.

What is claimed is:

A strip carrier for housing and carrying a plurality of similar and elongated components, comprising a continuous base plate of flexible sheet material of a width substantially greater than the length of components being carried, a continuous housing strip of flexible sheet material having a series of corrugations extending traversely of the housing strip and secured to a major portion of said base plate at one end and each side of the corrugations to define a first series of pockets open at one end for receiving a portion of the components carried, a continuous cover strip of flexible sheet material having a series of corrugations extending traversely of the cover strip and secured to the remaining portion of said base plate at one end and a portion of each side of the last-said corrugations to define a second series of pockets with the open end thereof overlapping the open end of said first series of pockets to define a plurality of closed chambers, crease means extending longitudinally of said base plate for folding the second series of pockets downwardly and out of overlapping relation with said first pockets to provide access to said first series of pockets, and a series of perforations in parallel spaced relationship from said crease means and extending longitudinally of said base plate in alignment with the open end of said first series of pockets to facilitate removal of the cover strip and associated base plate to expose a portion of the components carried in the said first series of pockets.

References Cited by the Examiner

UNITED STATES PATENTS

| | | | |
|---|---|---|---|
| 2,340,369 | 2/1944 | Downer. | |
| 2,839,774 | 6/1958 | Rand | 206—56 X |
| 2,892,538 | 6/1959 | Middleton | 206—43 |
| 3,074,540 | 1/1963 | Beich | 206—43 |
| 3,075,639 | 1/1963 | Lingley | 206—43 |
| 3,088,587 | 5/1963 | Dimmig | 206—56 X |
| 3,165,249 | 1/1965 | Peck | 206—65 X |

FOREIGN PATENTS 927,035   5/1963   Great Britain.

LOUIS G. MANCENE, *Primary Examiner.*